United States Patent [19]
Pittarelli

[11] 3,964,564
[45] June 22, 1976

[54] SYSTEM FOR TRAINING MOTORCYCLE OPERATORS

[75] Inventor: James A. Pittarelli, Howard Beach, N.Y.

[73] Assignees: Driver's Agency Ltd., Ridgewood; James A. Pittarelli, Howard Beach, both of N.Y.

[22] Filed: Dec. 19, 1973

[21] Appl. No.: 426,201

[52] U.S. Cl. .............................. 180/33 R; 35/11; 74/551.1; 180/77 C; 280/273
[51] Int. Cl.² .............................. B62D 61/02
[58] Field of Search ............... 180/77 C, 99, 30, 33; 280/263, 273, 7.16, ; 100/33; 74/551.1, 562, 482, 551.5; 35/11; 188/106 R

[56] References Cited
UNITED STATES PATENTS

| | | | |
|---|---|---|---|
| 599,859 | 3/1898 | McFadden | 280/7.16 |
| 901,447 | 10/1908 | Hoag et a. | 280/273 |
| 2,061,944 | 11/1936 | Jungkonz | 280/263 |
| 2,406,261 | 8/1946 | Sprinkel | 180/77 C |
| 3,686,776 | 8/1972 | Dahl | 35/11 |
| 3,742,928 | 7/1973 | Albertson | 123/198 DC |
| 3,783,961 | 1/1974 | Hooper | 180/33 A |
| 3,840,085 | 10/1974 | Smith | 180/14 R |

FOREIGN PATENTS OR APPLICATIONS

| | | | |
|---|---|---|---|
| 558,338 | 8/1923 | France | 188/106 R |
| 52,395 | 3/1955 | France | 280/273 |

OTHER PUBLICATIONS

"What's New Behind The Iron Curtain," Popular Science, June 1958, p. 68.

*Primary Examiner*—M. H. Wood, Jr.
*Assistant Examiner*—David M. Mitchell
*Attorney, Agent, or Firm*—Steinberg and Blake

[57] ABSTRACT

S system for training motorcycle operators. A conventional motorcycle carries a seat capable of accommodating a student in front of an instructor. The student operates the conventional handlebars and an additional set of handlebars is provided between the student and the instructor to be operated by the instructor. A transmission interconnects the two sets of handlebars so that they will be operated identically. Furthermore, while the conventional controls are available to be operated by the student, a set of additional controls are accessible to the instructor so that the instructor also can control the motorcycle.

5 Claims, 8 Drawing Figures

SYSTEM FOR TRAINING MOTORCYCLE OPERATORS

BACKGROUND OF THE INVENTION

The present invention relates to systems for training vehicle operators.

In particular, the present invention relates to a system for training motorcycle operators.

As is well known, motorcycles can become dangerous if they are not operated properly, and it is therefore important to provide proper training for a motorcycle operator. At the present time, there is no truly satisfactory system for training a motorcycle operator. Thus, in the case of conventional automobiles, it is a simple matter to provide for an instructor who sits beside a student an additional control at least in the form of an additional brake-control. However, because of the small size of a motorcycle and the fact that a pair of people can only be accommodated on a single motorcycle with considerable difficulty, the training of a motorcycle operator creates special problems. This problem has been recognized and attempts have been made to provide training for this purpose. However, all previously known systems for training a motorcycle operator require a motorcycle to be situated in a completely artificial environment such as with the wheels thereof resting on rollers so that the student can operate the motorcycle without danger. However such artificial environments for a motorcycle do not provide an effective training system because there is no duplication of conditions actually encountered on the streets and highways.

SUMMARY OF THE INVENTION

It is accordingly a primary object of the present invention to provide a system which will avoid the above drawbacks.

Thus, it is an object of the present invention to provide a system which enables a student to train on a motorcycle under conditions as encountered in traffic and other situations on actual streets and highways.

In particular it is an object of the present invention to provide for a motorcycle dual controls enabling both an instructor and a student to ride the same motorcycle with the instructor at all times being capable not only of instructing the student but also of controlling the motorcycle independently of the student.

In addition it is an object of the present invention to provide for a dual-controlled motorcycle an arrangement according to which it becomes possible for the instructor to override controls initiated by the student as well as to stop the operation of the motorcycle under emergency conditions, for example.

Thus, it is an object of the present invention to provide a system which does not require any artificial environment to be created to accommodate a motorcycle which is to be used for training purposes but instead enables an instructor and student to travel along any desired roads on the same motorcycle so that the student will receive the instruction precisely under the conditions which will be encountered when the student completes his training.

Furthermore it is an object of the present invention to provide a construction which enables a conventional motorcycle to be converted in a simple inexpensive and highly effective manner into a dual-controlled motorcycle capable of accommodating both a student and an instructor.

According to the invention the system for training a motorcycle operator includes a conventional motorcycle which has a front wheel, a rear wheel, a frame extending between and connected to the front and rear wheel and carrying an engine operatively connected to the rear wheel to drive the latter, the front wheel being connected with a conventional handlebar means. This conventional motorcycle has a seat means provided with front and rear mutually spaced portions for the student and operator, respectively. Thus the seat means has a front student-accommodating area and a rear instructor-accommodating area spaced rearwardly of this front area so that a given space is situated between the areas for accommodating the student and instructor. At the region of this latter space there is an additional handlebar means swingably carried by the frame of the motorcycle and connected by a transmission means with the conventional handlebar means, this transmission means compelling both of the handlebar means to operate identically.

BRIEF DESCRIPTION OF DRAWINGS

The invention is illustrated by way of example in the accompanying drawings which form part of this application and in which.

DESCRIPTION OF PREFERRED EMBODIMENTS

Figure 2:
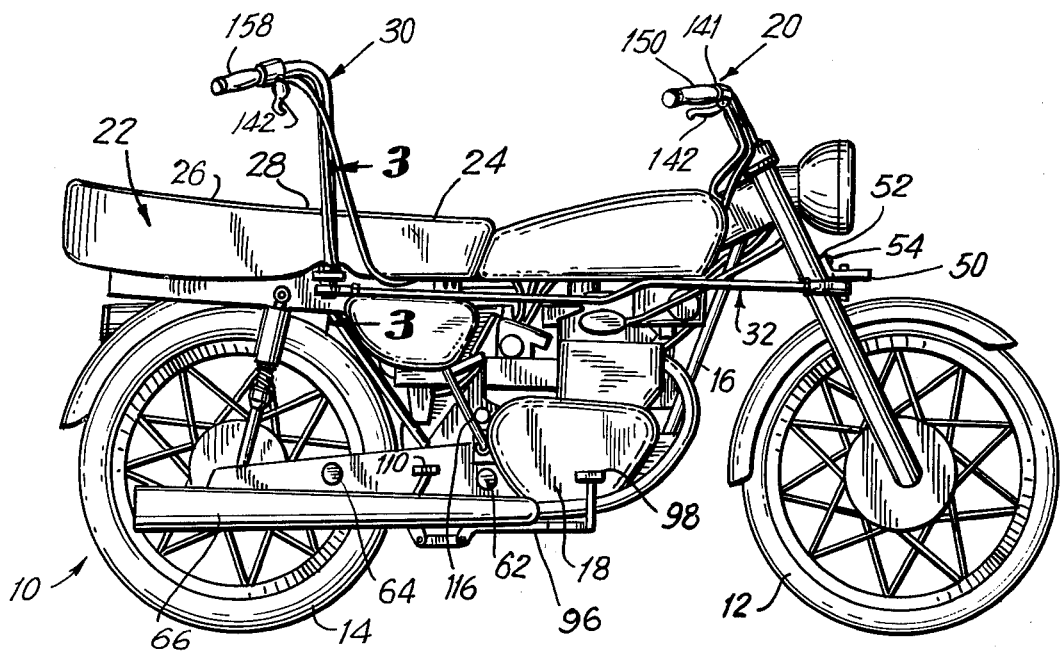
FIG. 2 is a side elevation of a conventional motorcycle provided with the system of the present invention.

Referring first to FIG. 2, there is illustrated therein a conventional motorcycle 10 having a front wheel 12, a rear wheel 14, and a frame 16 extending between and connected to the front and rear wheels. The frame 16 carries an engine 18 which is operatively connected in a well known manner to the rear wheel, as by a suitable chain drive or the like, for propelling the rear wheel and thus propelling the motorcycle. A conventional front handlebar means 20 is operatively connected with the front wheel 12 to achieve steering of the motorcycle 10, as is conventional.

The seat means 22 of the conventional motorcycle is carried by the frame 16 over the rear wheel 14, as illustrated. The illustrated seat means 22 is conventional and has a relatively great length, as is conventional. This length of the conventional seat means 22 is great enough to provide a front area 24 capable of accommodating a student and a rear area 26 capable of accommodating an instructor. If desired, however, separate seats or a special seat construction may be provided to accommodate both the student and the instructor. It has been found from experience, however, that a conventional elongated motorcycle seat structure, such as the structure 22, is capable of comfortably accommodating both the instructor and the student.

These areas 24 and 26 are spaced from each other so that a given space 28 is situated between the front area 24 for the student and the rear area 26 for the instructor. At this space 28 is located an additional handlebar means 30 which is accessible to the instructor. A transmission means 32 extends between and is operatively connected with both of the handlebar means 20 and 30 to compel them to operate identically.

Figure 1:
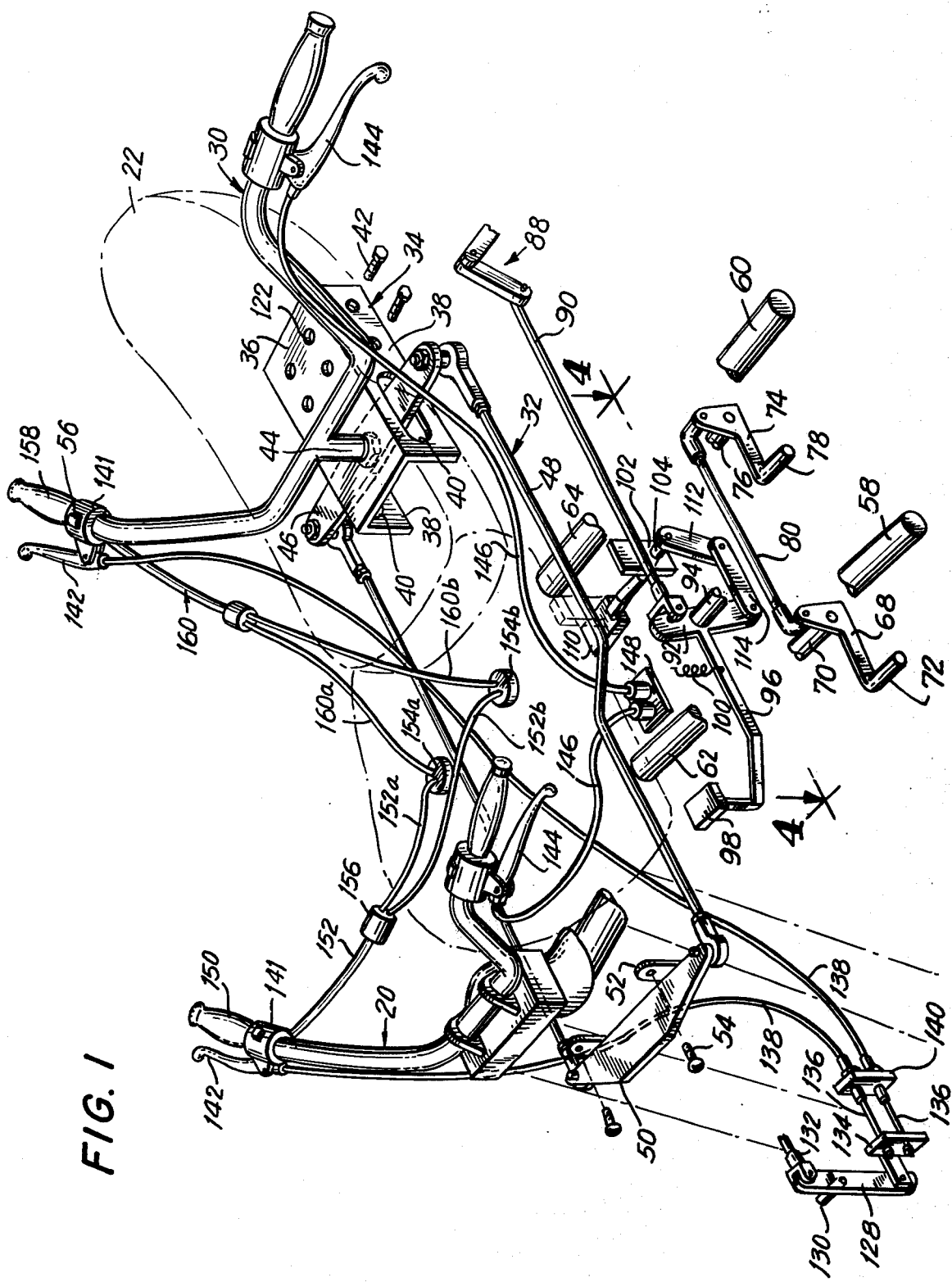
FIG. 1 is a schematic perspective illustration of one possible training system according to the present invention.

Referring to FIG. 1, it will be seen that the conventional frame 16 is modified to a relatively small extent by having a channel 34 situated beneath the seat means 22. This channel 34 has an upper wall 36 and a pair of side walls 38 extending downwardly from opposed side edges of the upper wall 36, these side walls 38 respectively being formed with aligned horizontally extending slots 40. the channel 34 may be mounted directly on the frame 16 after the seat 22 is removed by way of suitable fasteners 42 such as suitable bolts. The conventional seat means 22 can easily be modified, as by cutting away part of the padding thereof, if necessary, in order to accommodate both the channel 34 and the additional handlebar means 30.

This additional handlebar means 30 has a vertically extending shaft portion 44 swingably mounted on the wall 36 of the channel 34 and extending upwardly through the seat 22 in any suitable way. Beneath the wall 36 the swingable bar 44 is fixed to an intermediate portion of elongated transverse bar 46 which forms part of a parallelogram linkage means which forms the transmission means 32. This parallelogram linkage means includes a pair of elongated side rods 48 which extend on opposite sides of the frame 16 and which are pivotally connected at their rear ends to the opposed ends of the transverse lever 46 in the manner illustrated most clearly in FIG. 1.

The parallelogram linkage means includes also a front transverse bar 50 which is fixed directly to the front handlebar means 20. Thus as is apparent both from FIG. 1 as well as FIG. 2 this front transverse bar 50 fixedly carries a pair of upwardly directed extensions 52 for receiving the fasteners 54 such as suitable bolts capable of being threaded into threaded bores which are formed in the pair of bars of the fork of the handlebar means 20. As is well known the front handlebar means 20 will include a fork having a pair of bars between which the front wheel 12 is located, and these bars are suitably bored so that the front transverse bar 50 can be very conveniently and quickly fixed to the front handlebar means 20 for swinging movement therewith. Of course the rear bar 46 is fixed to the rear handlebar means 30 for swinging movement therewith. Thus these transverse bars 46 and 50 together with the elongated rods 48 form a parallelogram linkage means, the front ends of the bars 48 being pivotally connected to the opposed ends of the transverse bar 50 as illustrated. As a result of this transmission means 32, whenever the student turns the handlebar means 20 the handlebar means 30 will be compelled to carry out precisely the same movement, and when the instructor turns the rear handlebar means 30 the conventional front handlebar means 20 will be compelled to move in precisely the same way. Thus it becomes possible for the instructor to instruct by controlling the movement of the front handlebars while at the same time any movement initiated by the student will be immediately transmitted to the rear handlebars which are in front of the instructor.

The above-described provision of an extra set of handlebars 30 with the transmission means 32 interconnecting the conventional and additional handlebars in itself presents a considerable advantage because of the possibility simply with this structure alone of an instructor accompanying a student directly on a motorcycle to provide instruction in a highly effective manner.

However, the present invention goes further and provides additional highly advantageous features. Thus, there is shown in FIG. 1 at the end of the additional handlebar means 30 which is engaged by the right hand of the instructor, a kill-switch means 56. This kill-switch means 56 is electrically connected in an unillustrated manner into the electrical system of the engine 18. The electrical connection is such that the switch 56 is normally closed so that the electrical system of the engine 18 will function in a conventional manner. However, when the instructor depresses the upwardly projecting button of the switch 56, which is freely accessible as is illustrated in FIG. 1, this switch will be opened by the instructor in order to terminate the ignition and thus provide a convenient manner of terminating the operation of the motorcycle. Such operations may be required under emergency conditions.

Figure 4:
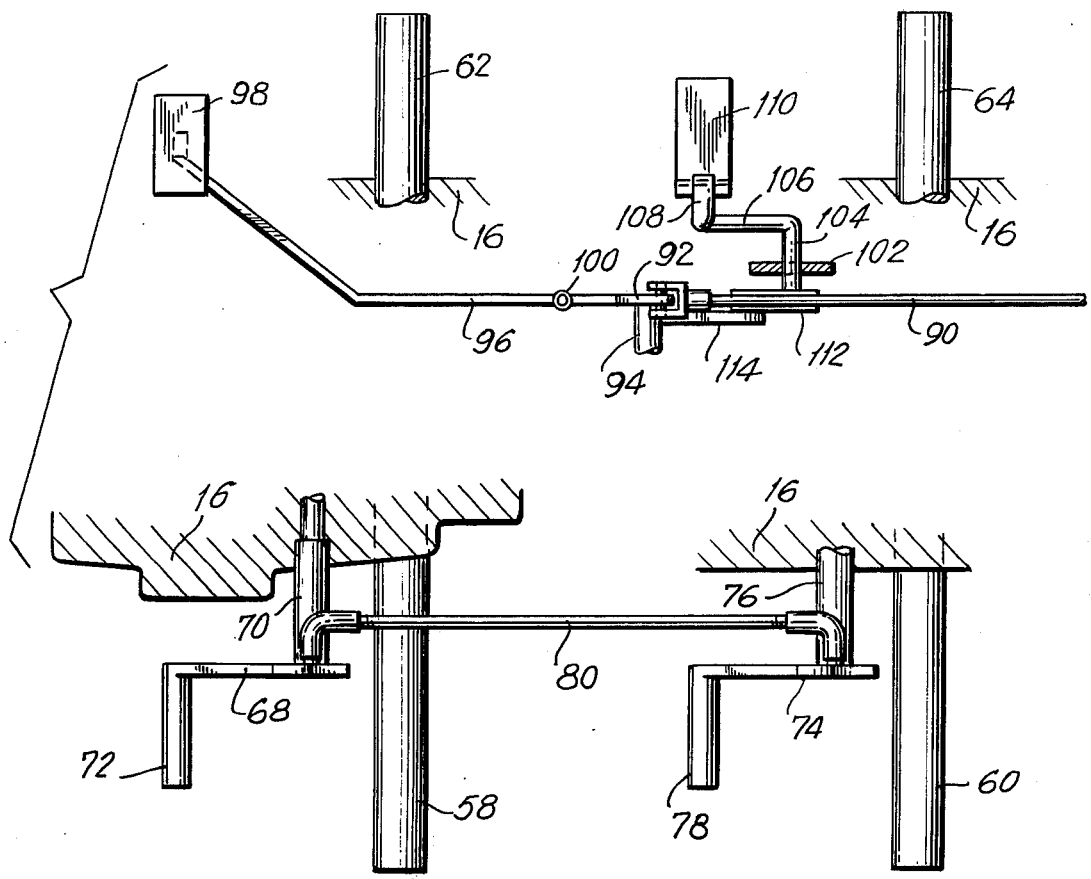
FIG. 4 is a schematic fragmentary plan view illustrating how controls shown in FIGS. 1 and 2 are situated with respect to the motorcycle frame.

Referring to FIG. 4, part of the frame 16 is fragmentarily illustrated therein. The frame 16 fixedly carries on one side a pair of foot rests 58 and 60 respectively provided for the left foot of the student and the left foot of the instructor. On the other side of the motorcycle the frame 16 carries a pair of additional foot rests 62 and 64 for the right foot of the student and the right foot of the instructor, respectively. These foot rests 62 and 64 are also visible in FIG. 2 where they are shown over the exhaust pipe 66 on one side of the motorcycle. The foot rests 58 and 60 are located over the exhaust pipe on the other side of the motorcycle.

Part of the control means which is carried by the frame 16 includes a gear-shift means. This gear-shift means includes a front gear-shift lever 68 fixed to a shaft 70 which is rotated in response to turning of the lever 68 for the purpose of shifting the gears in a well known manner. At its front end the lever 68 carries a projection 72 so that the student can operate on the projection 72 in order to turn the level 68. In the same way the gear-shift means includes a rear lever 74 identical with the lever 68 and swingably connected to the frame 16 by way of a shaft 76. This lever 74 also has a front projection 78 so that the instructor can engage the projection 78 in order to turn the lever 74. The levers 68 and 74 are interconnected by a link 80 which is pivotally connected at its front end to the upwardly extending arm of the lever 68 and at its rear end to the upwardly extending arm of the lever 74. Thus when the student turns the lever 68 the lever 74 will necessarily turn therewith while when the instructor turns the lever 74 the lever 68 will necessarily turn therewith. The result of turning of the lever 68 is to shift the gears in a well known manner so as to change the transmission ratio. Normally the student will control the position of the levers 68 and 74. However, at any time if the instructor feels that is required he can proceed himself to turn the lever 74 in order to change the transmission ratio.

Figure 5:
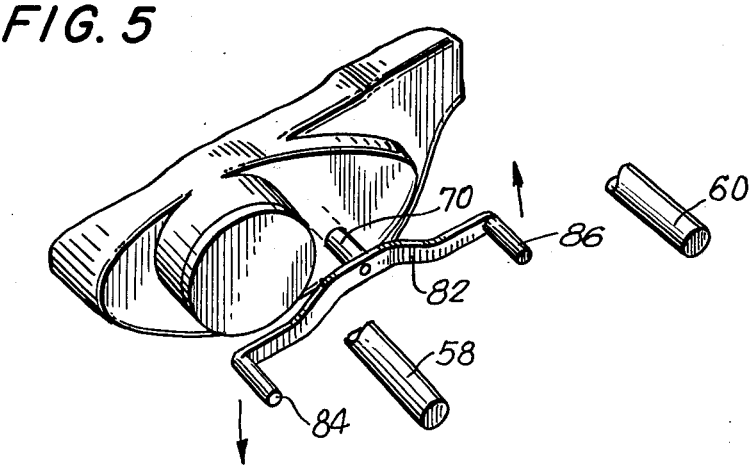
FIG. 5 is a fragmentary perspective illustration of an embodiment of a gear-shift arrangement different from that of FIGS. 1 and 4.

In a variation of this feature which is illustrated in FIG. 5 the shaft 70 which turns to change the transmission ratio in a known way is fixed to a single elongated lever 82, at an intermediate portion of the latter. This lever 82 carries at its front end a projection 84 for the student and at its rear end a projection 86 for the instructor. The same foot rests 58 and 60 are provided with this embodiment. Thus the student upon moving the projection 84 downwardly, as shown by the arrow in FIG. 5, will move the projection 86 upwardly. However the same effect can be achieved if the instructor moves the projection 86 upwardly. Thus in this case also it is possible for either the student or the instructor to change the transmission ratio and of course the instructor can at any time act on the projection 86 in order to change the transmission ratio. With the embodiment of FIG. 5, however, the instructor must move the projection 86 in a direction different to the direction in which the student moves the projection 84.

At the side of the motorcycle which is opposite from the gear-shift means, which is to say the side thereof which is visible in FIG. 2, there are a pair of pedal means for the student and instructor, respectively, in order to operate the rear brake. Thus, FIG. 1 shows a conventional brake control means 88 which in a known way will operate the brake which acts on the rear wheel 14. This action on the rear wheel is brought about by longitudinal movement of a rod 90 which is connected at its rear end to the brake control 88. This rod 90 is pivoted at its front end to the upper end of a lever 92 supported for swinging movement on a stationary pin or shaft 94 carried by the frame 16. The lever 92 has a forwardly extending bar portion 96 carrying a front pedal 98 for the right foot of the student so that the student can depress the pedal 98 in order to operate the brake control 88 for the rear wheel. Thus downward movement of the pedal 98 will result in forward movement of the rod 90 in order to actuate the rear brake. A spring 100 is provided to elevate the pedal 98 to an initial position, and of course the lever 92 will turn around the pin 94 so as to place the brake in a position where it does not retard rotary movement of the rear wheel 14.

In accordance with the invention the frame 16 is provided with a stationary plate 102 through which one arm 104 of a crank extends, this crank being shown also in FIG. 4. The crank includes an arm 106 extending perpendicularly from the arm 104 and fixed distant from the arm 104 to an additional arm 108 which is parallel to the arm 104. A pedal 110 is swingable on the outer end of the arm 108 so that the pedal 110 can be raised upwardly to the dotted line position shown in FIG. 4 to assume an outer or inoperative position. However when it is desired to operate the crank 106 the instructor will swing, with his foot, the pedal down to the solid-line position shown in FIG. 1. The arm 108 engages an upper surface of the pedal 110 to the rear of its pivot axis so that it is limited to swing between the upper vertical position and the lower horizontal position shown in FIG. 1. The rotary part 104 of the crank is turnable in the bracket 102 and is fixed with a lever 112 connected by a link 114 with the lever 92. Thus, as the instructor pushes down on the pedal 110 the lever 112 turns in a counterclockwise direction, as viewed in FIG. 1, displacing the link 114 rearwardly and pulling the rod 90 forwardly to achieve the same action as when the student depresses the pedal 98. In this way the instructor can operate the rear brake when desired. Thus, this system enables either the student or the instructor to control the rear wheel.

As is shown in FIG. 2, the conventional motorcycle includes a kick starter pedal 116. When the pedal 110 is in its operative horizontal position it is in the path of swinging movement of the kick starter pedal 116. Therefore the pedal 110 is normally maintained in its idle vertical position where it is situated beyond the path of movement of the kick starter pedal 116 so that the latter can be freely operated. However, the operator can at any time swing the pedal 110 down to its horizontal operative position to operate the rear brake.

Figure 3:
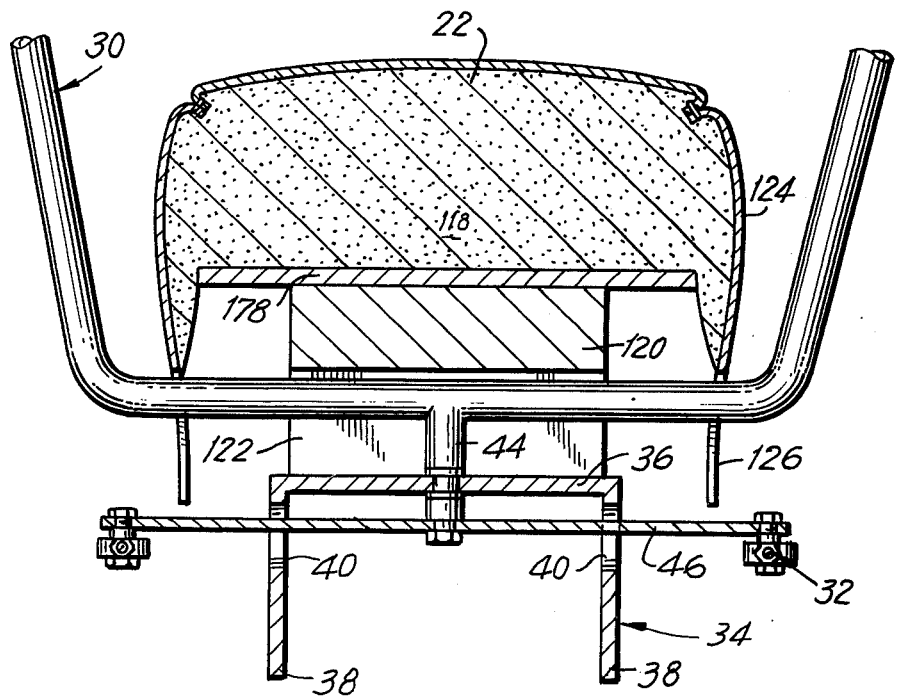
FIG. 3 is a transverse sectional elevation taken along line 3—3 of FIG. 2 in the direction of the arrows.

FIG. 3 shows in detail how the seat means 22 has its padding supported on a fixed plate 118 of the frame 16, this plate resting on a bar 120 which is fixed to and forms part of the frame 16. The upper wall 36 of the channel 34 is bolted directly to the support 120 at the lower surface of the latter with bolts which extend upwardly through the openings 122 shown in FIG. 1. The element 120 is provided with a hollow portion 124 in which the horizontal part of the additional handlebar means 30 is freely swingable. The plastic covering sheet 124 of the seat means is formed with cutouts 126 through which the horizontal part of the handlebar means 30 freely extends as shown in FIG. 3. The vertical portion 44 of the handlebar means is supported for swinging movement on the upper wall 36 of the channel 34 in the manner illustrated in FIG. 3. The lower end of the vertical shaft part 44 is fixed to the transverse bar 46 of the parallelogram linkage in the manner shown in FIG. 3 with this bar 46 extending through the slots 40 in the manner described above.

As may be seen from FIG. 1, the frame 16 carries a front brake control means 128 which is conventional, this means taking the form of a swingable lever supported on a pin 130 which is fixed to the frame and connected through a transmission 132 to the brake of the front wheel 12. The lever 128 is swung in response to forward and rearward movement of a bracket 134 which is fixed to the free ends of the inner wires 136 of a pair of Bowden cables which are provided with the outer sheaths 138 in which the Bowden cable wires 136 are movable in a well known manner. The ends of the sheaths 138 are fixed to a stationary plate 140 of the frame means, while the operating wires 136 extend beyond the plate 140 to be fixed to the bracket 134 in the manner shown at the lower left of FIG. 1.

The Bowden cables 138 extend up to the free end regions of the handlebar means 20 and 30 which are engaged by the right hands of the student and instructor, respectively. At these regions of the handlebar means there are clamps 141 on which operating handles 142 are swingable. These handles can be grasped by the fingers of the student and instructor for the purpose of operating the Bowden cables. Thus when the student swings the handle 142 the upper Bowden cable will be operated to control the brake of the front wheel while when the instructor swings the lever 142 situated at the additional handlebar means 30 the lower Bowden cable having the lower wire 136 shown in FIG. 1 will operate the front brake. Thus in this case also either the student or the instructor can operate the brake of the front wheel.

In much the same way the other ends of the pair of handlebar means 20 and 30 swingably carry levers 144 respectively accessible to the student and instructor.

These levers also act through Bowden cables 146, and downwardly beyond the plate which is shown in FIG. 1 these Bowden cables are operatively connected with a clutch. Thus in this case also the student or the instructor can operate the clutch in connection with the gear shift control, as described above.

It is apparent, therefore, that with the structure as described above the frame and pair of handlebar means carry control means both for the student and for the instructor, this control means enabling either a student or the instructor to shift the gears, to operate the rear brake or the front brake, and to operate the clutch in conjunction with the shifting of the gears.

The pair of control means provided on the one hand for the student and on the other hand for the instructor also include structure for controlling the carburetor by way of the throttle controls. Thus, referring to FIG. 1 it will be seen that the student has available at his right hand the rotary grip 150 which acts in a known way through the Bowden cable assembly 152 on the carburetors. In the illustrated example the motorcycle has two carburetors, and the Bowden cable assembly 152 has a pair of branches 152a and152b which respectively extend from the tops of the carburetors 154a and 154b down into the latter in order to effect the throttling controls in a well known manner. The part of the Bowden cable assembly 152 which extends from the rotary control 150 communicates through a unit 156 with the branches 152a and 152b. Thus the unit 156 may take the form of a cylindrical housing having a slidable piston connected to the movable wire within the sheath of the Bowden cable portion 152 which extends to the rotary control 150, while this piston is connected to a pair of wires extending through the sheaths of the Bowden cable branches 152a and 152b, for bringing about precisely the same controls in both carburetors in response to turning of the control 150 by the student.

In much the same way the instructor has at the additional handlebar means 30 a rotary throttle control 158 which acts in a known way through a Bowden cable assembly 160 having the branches 160a and 160b cooperating with the carburetors 154a and 154b in the manner described above in connection with the controls from the student. Therefore the pair of control means also include independently operable carburetor controls for the student and instructor, respectively, so that if the student does not properly control the speed of the engine the instructor may correct the control.

Figure 6:
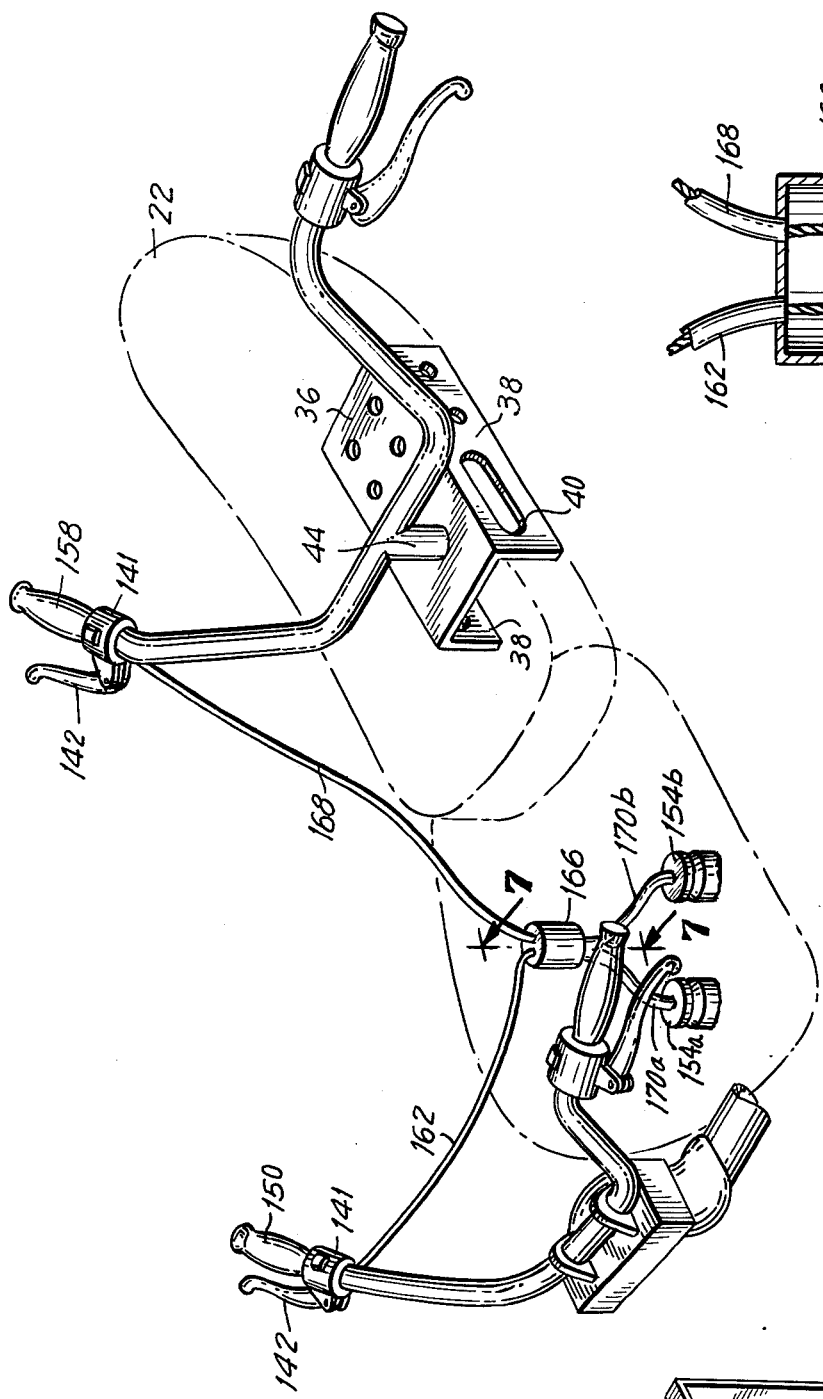
FIG. 6 is a perspective illustration of a carburetor control arrangement which is different from that of FIG. 1.
Figure 7:
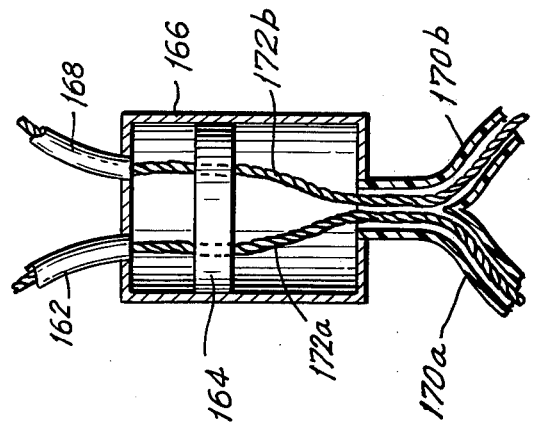
FIG. 7 is a sectional elevation of part of the carburetor control arrangement shown in FIG. 6.

A variation of the above throttle controls is illustrated in FIGS. 6 and 7, with this embodiment being somewhat simpler than that of FIG. 1. Thus in the case of FIGS. 6 and 7 the student and operator respectively have the rotary throttle controls 150 and 158 as described above. However the rotary control 150 operates through the Bowden cable transmission 162 on a piston 164 (FIG. 7) situated in the cylindrical housing 166, this assembly shown in FIG. 7 being similar to the unit 156 described above. With the construction of FIGS. 6 and 7, however, the rotary throttle control 158 available to the instructor acts through a Bowden cable assembly 168 on the same piston 164, as is particularly apparent from FIG. 7. The housing 166 communicates with a pair of branches 170a and 170b connected to the covers at the top ends of the carburetors 154a and 154b. These branches 170a and 170b form sheaths of Bowden cable extensions which include the wires 172a and 172b which extend through the sheaths 170a and 170b, respectively, down into the pair of carburetors for controlling the latter.

Thus, with this simplified arrangement only one control extends down into each carburetor. The pair of carburetor controls are thus conventional at the carburetors themselves and it is not necessary to introduce a second pair of controls into the carburetors themselves as is required with the embodiment described above and shown in FIG. 1. With the embodiment of FIGS. 6 and 7 the pair of single carburetor controls are joined to the common piston 164 which is capable of being displaced either by the student or by the instructor in response to rotation of the elements 150 or 158. Therefore with this simplified construction it is also possible for the instructor to correct the throttling as required.

Figure 8:
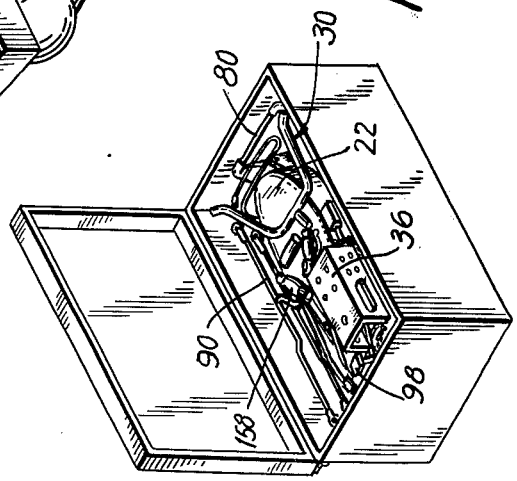
FIG. 8 is a schematic perspective view of a kit according to the present invention.

In accordance with the present invention the parts required to convert a conventional motorcycle into a dual-controlled motorcycle can be assembled into a kit. Thus, referring to FIG. 8 it will be seen that in a suitable container there are situated a number of components which can be added to a conventional motorcycle so as to convert the latter, rendering it into a dual-controlled motorcycle capable of being used for teaching purposes. FIG. 8 shows such components as the additional handlebar means 30, the channel 36, the brake control unit 98, the additional throttle control unit 158, the linkage component 90, and the linkage unit 80. Of course it is to be understood that many more components are included in the kit which is shown in FIG. 8. Thus, a kit according to the present invention will include such units as the front steering bracket, the two push-and-pull steering rods, various bell cranks and bell crank housings, the additional handlebar means, and various throttle controls, light controls, an extra starter button, and an engine shut-off switch. In addition rear and front brake lever and cable assemblies will be provided together with a left rear grip with a horn button and left and right directional signal switches together with clutch levers and cables. Furthermore the kit will include rear brake and rear gear shift assemblies as well as, if desired, a rear seat extension, although a completely modified seat may be used if desired. Furthermore the kit will include such components as a front cable bracket to accept the front and rear brake cables, a signal light keeper to warn students and instructors to turn off the signal lights, as well as an adapter for the carburetor to accept the rear throttle cable. Additional components such as a tapered roller bearing on which the additional handlebars turn may be provided.

Thus, by way of such a kit it is possible to convert any conventional motorcycle into a dual-controlled motorcycle which may be used for training purposes.

It is apparent, therefore, that with the abovedescribed structure of the invention a single motorcycle may be operated both by a student and an instructor. Both of these individuals have complete control of the motorcycle. It is a relatively simple matter to convert a conventional motorcycle into a dual-controlled motorcycle according to the invention at relatively low cost. Moreover, the instructor has available additional controls for safety purposes, such as the kill switch 56 referred to above.

What is claimed is:

1. In a system for training motorcycle operators, a conventional motorcycle having front and rear wheels, a frame connected therebetween, handlebar means operatively connected to said front wheel for steering purposes, an engine carried by the frame and operatively connected to the rear wheel for driving the motorcycle, and control means carried by the frame and handlebar means for controlling the motorcycle, said frame carrying a seat means large enough to accommodate a student for operating the conventional motorcycle in a conventional manner and an instructor behind the student, said seat means having a front student-accommodating area and a rear instructor-accommodating area situated rearwardly of said front student-accommodating area with a predetermined space situated between said area, additional handlebar means pivotably mounted on said frame at the region of said space, and transmission means extending between said additional handlebar means and the conventional handlebar means connected to the front wheel for compelling both of the handlebar means to operate identically, and additional control means operatively connected with said frame and said additional handlebar means to be accessible for operation by the instructor to control the motorcycle, said transmission means being in the form of a parallelogram linkage, said frame including at said space a channel having an upper wall and a pair of side walls extending downwardly from opposed side edges of said upper wall and respectively formed with aligned slots, said additional handlebar means being pivotally connected to said upper wall while said parallelogram linkage includes a rear transverse bar extending through said slots and beyond said channel and having an intermediate portion connected to said additional handlebar means for turning movement therewith, a front transverse bar connected to the conventional handlebar means, and a pair of elongated side rods respectively disposed on opposite sides of said frame and each connected between and pivotally connected to the front and rear transverse bars.

2. In a system for training motorcycle operators, a conventional motorcycle having front and rear wheels, a frame connected therebetween, handlebar means operatively connected to said front wheel for steering purposes, an engine carried by the frame and operatively connected to the rear wheel for driving the motorcycle, and control means carried by the frame and handlebar means for controlling the motorcycle, said frame carrying a seat means large enough to accommodate a student for operating the conventional motorcycle in a conventional manner and an instructor behind the student, said seat means having a front student-accommodating area and a rear instructor-accommodating area situated rearwardly of said front student-accommodating area with a predetermined space situated between said areas, additional handlebar means pivotably mounted on said frame at the region of said space, and transmission means extending between said additional handlebar means and the conventional handlebar means connected to the front wheel for compelling both of the handlebar means to operate identically, and additional control means operatively connected with said frame and said additional handlebar means to be accessible for operation by the instructor to control the motorcycle, both of said control means including a pair of gear-shift means respectively situated one behind the other on one side of said frame for shifting gears, and means connecting said pair of gear-shift means operatively to each other for operating simultaneously, said pair of gear-shift means including a single swingable lever having front and rear ends respectively carrying projections respectively accessible on the one hand to a student and on the other hand to an instructor for operating the gear-shift means so that the instructor must swing said lever in a direction opposite from the student.

3. In a system for training motorcycle operators, a conventional motorcycle having front and rear wheels, a frame connected therebetween, handlebar means operatively connected to said front wheel for steering purposes, an engine carried by the frame and operatively connected to the rear wheel for driving the motorcycle, and control means carried by the frame and handlebar means for controlling the motorcycle, said frame carrying a seat means large enough to accommodate a student for operating the conventional motorcycle in a conventional manner and an instructor behind the student, said seat means having a front student-accommodating area and a rear instructor-accommodating area situated rearwardly of said front student-accommodating area with a predetermined space situated between said areas, additional handlebar mens pivotably mounted on said frame at the region of said space, transmission means extending between said additional handlebar means and the conventional handlebar means connected to the front wheel for compelling both of the handlebar means to operate identically, and additional control means operatively connected with said frame and said additional handlebar means to be accessible for operation by the instructor to control the motorcycle, the engine including at least one carburetor, and both of said control means respectively including independently operable carburetor-control means respectively connected operable with said carburetor and both of said handlebar means for controlling said carburetor, the engine including a plurality of carburetors, and each of said carburetor-control means extending into each of the carburetors.

4. In a system for training motorcycle operators, a conventional motorcycle having front and rear wheels a frame connected therebetween, handlebar means operatively connected to said front wheel for steering purposes, an engine carried by the frame and operatively connected to the rear wheel for driving the motorcycle, and control means carried by the frame and handlebar means for controlling the motorcycle, said frame carrying a seat means large enough to accommodate a student for operating the conventional motorcycle in a conventional manner and an instructor behind the student, said seat means having a front student-accommodating area and a rear instructor-accommodating area situated rearwardly of said front student-accommodating area with a predetermined space situated between said areas, additional handlebar means pivotably mounted on said frame at the region of said space, transmission means extending between said additional handlebar means and the conventional handlebar means connected to the front wheel for compelling both of the handlebar means to operate identically, and additional control means operatively connected with said frame and said additional handlebar means to be accessible for operation by the instructor to control the motorcycle, the engine including at least one carburetor, and both of said control means respectively including independently operable carburetor-control means respectively connected operably with said carburetor and both of said handlebar means for controlling said carburetor, the engine including a plurality of carburetors, both of said control means having a common portion situated outside of the carburetors and operatively connected therewith for controlling the same, and the two carburetor control means including independent portions extending from the common portion to the conventional and additional handlebar means.

5. In a system for training motorcycle operators, a conventional motorcycle having front and rear wheels, a frame connected therebetween, handlebar means operatively connected to said front wheel for steering purposes, an engine carried by the frame and operatively connected to the rear wheel for driving the motorcycle, and control means carried by the frame and handlebar means for controlling the motorcycle, said frame carrying a seat means large enough to accommodate a student for operating the conventional motorcycle in a conventional manner and an instructor behind the student, said seat means having a front student-accommodating area and a rear instructor-accommodating area situated rearwardly of said front student-accommodating area with a predetermined space situated between said areas, additional handlebar means pivotably mounted on said frame at the region of said space, and transmission means extending between said additional handlebar means and the conventional handlebar means connected to the front wheel for compelling both of the handlebar means to operate identically, and additional control means operatively connected with said frame and said additional handlebar means to be accessible for operation by the instructor to control the motorcycle, a rear-brake control means being provided for controlling the rear wheel, and front and rear pedal means respectively accessible to a student and to an instructor and both operativey connected with said rear-brake control means for providng a control of the latter either by the instructor or by the student, said rear pedal means including a swingable lever and a pedal pivotally connected to said lever for movement between a horizontal operative position and a substantially vertical idle position, the motorcycle including a conventional kick starter pedal and said pedal of said rear pedal means being situated in the path of movement of said kick starter pedal when said pedal of said rear pedal means is in the horizontal operative position thereof, whereby when it is desired to use the conventional kick starter pedal the pedal of the rear pedal means can be displaced to its vertical position where it is situated beyond the path of movement of the conventional kick starter pedal.

* * * * *